United States Patent Office 3,838,103
Patented Sept. 24, 1974

3,838,103
CURABLE ARALKYLENE/PHENOL RESINS AND THE PROCESS OF CURING SAID RESINS USING SALICYLIC ACID
Alfred Gerald Edwards, Stourport-on-Severn, England, assignor to Albright & Wilson Limited, Oldbury, near Birmingham, Warwickshire, England
No Drawing. Filed Sept. 5, 1972, Ser. No. 286,584
Claims priority, application Great Britain, July 9, 1971, 41,691/71
Int. Cl. C08g 37/06
U.S. Cl. 260—52      5 Claims

ABSTRACT OF THE DISCLOSURE

The cure rate of xylok resins can be accelerated by admixing certain acids with the hexamine curing agent normally employed. Acids which have so far been found to be suitable include a variety of organic acids. Salicylic acid being particularly useful.

The present invention relates to the curing of resin systems, in particular it relates to the curing of resins containing repeating groups of the formula

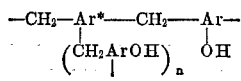

where Ar* is an aromatic hydrocarbon or hydrocarbonoxy group, whilst optionally has inert substituents, and Ar is the residue of a phenolic compound as hereinafter defined and $n$ is 0 or 1. The production of resins of this type is described in U.S. Pat. No. 3,576,788.

In that specification there is described a resin obtained by reacting (1) an aralkyl ether of the general formula R'[—(CH$_2$OR]$_a$ and/or an aralkyl halide of the general formula R"[(—CH$_2$X)]$_a$, wherein R' is a divalent or trivalent aromatic hydrocarbon or hydrocarbonoxy radical, R" is a divalent or trivalent aromatic hydrocarbon radical, R' and R" optionally containing inert substituents in the aromatic nucleus. R is an alkyl radical containing less than 6 carbon atoms, X is chlorine, bromine or iodine and $a$ has a value of 2 or 3, with a molar excess normally of at least 1.3:1 preferably in the range 1.4 to 2.5:1 of (2) a phenolic compound or a phenolic compound and a compound containing aromatic nuclei.

Thus Ar* above may be either R' or R". Naturally if $a$ is 3 then a further ArOH group may be bonded to Ar* through another methylene bridge.

The term "phenolic compound" as employed herein includes any compound or mixture of compounds derived from benzene and containing from one to three, preferably one or two, hydroxyl radicals attached to the aromatic nucleus, there being a total or not more than three substituents attached to carbon atoms in the benzene nucleus. Examples of phenolic compounds for use in the process of this invention include phenol, p-cresol, resorcinol, catechol, isopropyl catechol, diphenylolpropane, diphenylolmethane, alkyl phenols e.g. p-ethylphenol, p-tert-butylphenol and p-tert-octyl phenol, p-phenylphenol, m-phenylphenol, p-aminophenol, pyrogallol and phloroglucinol. When the resinous reaction product is intended for laminating or moulding applications p-phenylphenol, diphenylolpropane and phenol are, in general, preferred.

According to the invention there is provided a curable resin composition comprising (a) A resin having at least some repeating units of the formula

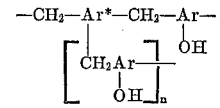

where Ar* is a divalent or trivalent aromatic hydrocarbon or hydrocarbonoxy group which may optionally be substituted Ar is the residue of a phenolic compound as hereinbefore defined and $n$ is 0 or 1;
(b) Hexamethylene tetramine; and
(c) At least one of the following acids: benzilic acid, cinnamic acid, hydrocinnamic acid, p-hydroxy benzoic acid, benzoic acid, α-naphthoic acid, phenyl acetic acid, salicylic acid, p-toluic acid and β-toluene sulphonic acid. The resin is of course conveniently made if the phenolic compound or a mixture of a phenolic compound and another aromatic compound is reacted with an aralkyl ether of the formula R'[—(CH$_2$OR)]$_a$ and/or an aralkyl halide of the general formula R"[—(CH$_2$X)]$_a$. In these general formulae R' may represent any divalent or trivalent aromatic hydrocarbon or hydrocarbonoxy radical, for example the phenylene radical, the diphenylene radical, the diphenylene oxide radical

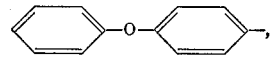

the radical

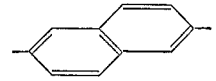

or the radical

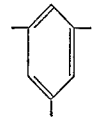

The R" radical present in the aralkyl halide may be any divalent or trivalent aromatic hydrocarbon radical, for example the phenylene radical, the diphenylene radical or the radical

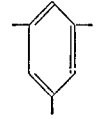

The radical R may be an alkyl radical containing less than six and preferably less than 4 carbon atoms and X represents a chlorine, bromine or iodine atom. The preferred compounds (1) for reaction with the phenolic compounds are those in which $a$ has a value of 2, particularly the p-xylylene dihalides, for example p-xylylene dichloride, and the p-xylylene dialkyl ethers for example p-xylylene-glycoldimethylether.

If desired the R' and R" radicals may contain substituents for example methyl radicals attached to the aromatic nucleus provided the said substituents are inert under the conditions of the reaction. In fact the presence of chlorine or fluorine atoms in some or all of the available positions in the aromatic nucleus has been found advantageous in that it leads to improved flame resistance in the resulting polymeric products. Examples of substituted aralkyl ethers and aralkyl halides which may be employed according to this invention are 2,3,5,6-tetrachloro-1,4-di(methoxy-methyl)-benzene.

Such resins have a number of phenolic hydroxyl groups attached to the polymer chains in a similar manner to those of phenol-formaldehyde novolacs. Thus they may be caused to cure by treatment with a curing catalyst. In the above-mentioned U.S. Pat. 3,576,788 there is suggested the use of hexamethylene tetramines and other phenolic novolac hardening agents for this purpose. There have at various times been suggestions in the field of phenol-formaldehyde resins for example in British Specification No. 1,114,004 that the addition of various acids in addition to the hexamethylene tetramine might accelerate the cure rate of such resins.

We have now found that certain specific acids will increase the rate of curing of resins of this type claimed in the above-mentioned Pat. No. 3,576,788 if they are admixed in amounts of from 10% up to equal weight, preferably in amounts of 20–65% by weight with the conventional hardening agent. Such acids include benzilic acid, cinnamic acid, hydrocinnamic acid, benzoic acid, p-hydroxy benzoic acid, α naphthoic acid, phenylacetic acid, salicylic acid, p-toluic acid and p-toluene sulphonic acid. We have found however that other acids, such as acetic acid and oxalic acid are not particularly satisfactory. We have further found that for some of the acids employed, for example salicylic acid, p-toluene sulphonic acid and phenyl acetic acid there may be a preferred amount of acid to be employed in order to obtain the best results, in these particular cases the best results are obtained using from 0.2 to 0.5 grams of salicylic p-toluene sulphonic or phenyl acetic acids per gram of hexamine.

Desirably the acids employed are simply admixed with the hexamine curing agent before this is mixed with the resin which is to be cured. Alternatively they may be pre-mixed with the resin. Since the curing of the resin is only brought about by heating normally to a temperature in excess of 70° C., preferably over 100° C. optimally about 120° C. it is often desirable to admix the hexamine and the acid with the resin, and possibly other ingredients and to store them at low temperature for some considerable period before actually bringing about the cross linking. One particular form of composition in which such pre-mixing is employed is when the resins are employed in a moulding powder. Such materials normally comprise an inorganic filler, such as asbestos flour, mica, chopped glass strands or silica and the resin material together with the curing agent. The inorganic filler and the resin will normally be present in a weight ratio of from 0.3:1 to 4.0:1. The hexamine curing agent will normally be employed in an amount of from 8 to 20% by weight based on the weight of the resin. Other components such as pigments and lubricants, accelerators, anti-staining agents and stabilizers, for example calcium stearate and magnesium oxide may also be present if desired.

The process of the invention is illustrated to the following example.

EXAMPLE 1

A moulding composition was prepared from the following ingredients:

| | Parts by weight |
|---|---|
| Asbestos flour | 300 |
| Polymer obtained from xylylene glycol dimethyl ether and phenol | 200 |
| Magnesium oxide | 6 |
| Calcium stearate | 10 |
| Hexamine | 25 |
| Pigment | 4 |
| Salicyclic acid | 7.5 |

These were mixed on a 2 roll mill at 120° C. for ten minutes and the resulting product had a minimum cure time of seventy-five seconds. The same composition made without the salicyclic acid added had a minimum cure time of one hundred and twenty seconds.

EXAMPLE 2

A number of compositions were formulated as follows and tested in the same manner as Example 1.

| | Parts by weight |
|---|---|
| Asbestos flour | 300 |
| Resin obtained from p-xylylene glycol dimethyl ether and phenol | 200 |
| Magnesium oxide | 8 |
| Calcium stearate | 8 |
| Hexamine | 22 |
| Acid as shown below | 5 |

| Acid: | Minimum cure time, secs. |
|---|---|
| p-Toluene sulphonic | 105 |
| Benzoic | 105 |
| Cinnamic | 90 |
| Hydro cinnamic | 90 |
| Phenyl acetic | 105 |
| α-Naphthoic | 90 |
| p-Toluic | 90 |
| Benzilic | 90 |
| p-Hydroxy benzoic | 90 |

EXAMPLE 3

A number of compositions were formulated as follows using various amounts of salicylic acid, p-toluene sulphonic acid and phenyl acetic acid.

| | Parts by weight |
|---|---|
| Asbestos flour | 300 |
| Resin as above | 200 |
| Magnesium oxide | 8 |
| Calcium stearate | 8 |
| Hexamine | 22 |
| Acid, as shown. | |

| Acid | Minimum cure time in seconds for amount shown | | | | |
|---|---|---|---|---|---|
| | 2.5 | 5.0 | 7.5 | 10.0 | 20.0 |
| Salicylic | 120 | 90 | 75 | 105 | 105 |
| p-Toluene sulphonic | | 105 | 90 | 120 | |
| Phenyl acetic | | 105.0 | 90 | 120 | |

We claim:

1. A curable resin composition comprising (a) a resin prepared by the reaction of at least one compound selected from the group consisting of aralkyl ethers of the formula R'(—CH$_2$OR)$_2$ wherein R' is phenyl and wherein R is an alkyl radical of from 1 to 6 carbon atoms, with between 1.4 and 2.5 moles of phenol per mole of said ether; (b) hexamethylene tetramine in an amount between 8% and 20% based on the weight of said resin; and (c) salicylic acid in an amount of from 20%–50% based on the weight of said hexamethylene tetramine.

2. A composition according to claim 1 wherein said aralkyl ether is p-xylylene glycol dimethyl ether.

3. A composition according to claim 1 which also comprises an inorganic filter.

4. A process for producing a cured composition comprising heating (a) a resin, which has been prepared by the reaction of at least one ether selected from the group consisting of ethers of the formula R'(—CH$_2$OR)$_2$ wherein R' is phenyl and R is an alkyl radical of from 1 to 6 carbon atoms, with between 1.4 and 2.5 moles of phenol per mole of said ether; with (b) hexamethylene tetramine in an amount between 8% and 20% based on the weight of said resin; and (c) salicylic acid in an amount of from 20%–50% based on the weight of said hexamethylene tetramine.

5. A process according to claim 4 wherein said ether is p-xylylene glycol dimethyl ether.

References Cited

UNITED STATES PATENTS

| | | | |
|---|---|---|---|
| 1,020,594 | 3/1912 | Aylsworth | 260—59 |
| 1,102,634 | 7/1914 | Aylsworth | 260—59 X |
| 3,020,254 | 2/1962 | Less et al. | 260—59 X |
| 3,576,788 | 4/1971 | Harris et al. | 260—52 |
| 3,538,040 | 11/1970 | Grazen | 260—51 X |

FOREIGN PATENTS 1,114,004  5/1968  Great Britain.

HOWARD E. SCHAIN, Primary Examiner

U.S. Cl. X.R.

260—38

UNITED STATES PATENT OFFICE
CERTIFICATE OF CORRECTION

Patent No. 3,838,103  Dated September 24, 1974

Inventor(s) ALFRED GERALD EDWARDS

It is certified that error appears in the above-identified patent and that said Letters Patent are hereby corrected as shown below:

In Column 1, line 9, replace "July 9, 1971" with --September 7, 1971--.

In Column 2, line 26, replace the structural formula with the following structural formula In Column 4, line 54, replace "phenyl" with --phenylene--.

In Column 4, line 64, replace "filter" with --filler--.

Signed and sealed this 14th day of January 1975.

(SEAL)
Attest:

McCOY M. GIBSON JR.
Attesting Officer

C. MARSHALL DANN
Commissioner of Patents